US006992569B2

(12) United States Patent
Nimberger et al.

(10) Patent No.: US 6,992,569 B2
(45) Date of Patent: Jan. 31, 2006

(54) SAFETY SHUTDOWN SYSTEM

(75) Inventors: Spencer M. Nimberger, Houston, TX (US); Kevin Cessac, Houston, TX (US)

(73) Assignee: PGI International, Ltd., Houston, TX (US)

(*) Notice: Subject to any disclaimer, the term of this patent is extended or adjusted under 35 U.S.C. 154(b) by 112 days.

(21) Appl. No.: 10/666,308

(22) Filed: Sep. 19, 2003

(65) Prior Publication Data
US 2005/0073394 A1 Apr. 7, 2005

(51) Int. Cl.
G08B 21/00 (2006.01)
F17D 3/01 (2006.01)
B67C 3/30 (2006.01)

(52) U.S. Cl. .................... 340/309.5; 340/539.11; 340/450; 340/451; 340/606; 340/609; 137/624.11; 141/197; 141/231

(58) Field of Classification Search ............ 340/606, 340/609; 137/624.11; 141/197, 231
See application file for complete search history.

(56) References Cited

U.S. PATENT DOCUMENTS

| 5,142,271 | A | * | 8/1992 | Bailey et al. ............... 340/606 |
| 5,441,070 | A | * | 8/1995 | Thompson ..................... 137/1 |
| 5,554,895 | A | * | 9/1996 | Ross et al. ................... 307/141 |
| 5,568,825 | A | * | 10/1996 | Faulk .................... 137/624.11 |
| 5,823,235 | A | * | 10/1998 | Alley et al. ................. 141/197 |
| 5,975,162 | A | * | 11/1999 | Link, Jr. ..................... 141/231 |
| 5,999,087 | A | * | 12/1999 | Gunton .................... 340/309.5 |
| 6,140,620 | A | * | 10/2000 | Aldridge et al. ............ 219/493 |
| 6,164,319 | A | * | 12/2000 | Cochran et al. ......... 137/487.5 |
| 6,788,209 | B2 | * | 9/2004 | Cothern et al. ............. 340/606 |

OTHER PUBLICATIONS

Rudolf F. Graf: Encyclopedia of Electronic Circuits, vol. 1, p. 668 and 747, Figure 88–17.*

* cited by examiner

Primary Examiner—Jeffrey Hofsass
Assistant Examiner—Anne V. Lai
(74) Attorney, Agent, or Firm—Browning Bushman P.C.

(57) ABSTRACT

A safety shutdown system is provided for use with a fluid delivery system, such as used on a delivery vehicle. The safety shutdown system includes a plurality of sensors for sensing characteristics of a fluid delivery system. A controller includes a query timer function initiated in response to the sensed characteristic of the fluid delivery system and/or in response to activation of selected vehicle functions. The operator may repeatedly reset the query timer before it times out by pressing a button on a wireless transmitter. If the timer times out, however, the controller automatically shuts off a vehicle engine and/or closes a valve to prevent further fluid delivery.

16 Claims, 3 Drawing Sheets

SAFETY SHUTDOWN SYSTEM

FIELD OF THE INVENTION

The present invention relates to an operator-controlled safety shutdown system. More particularly, the invention is directed to an operator-controlled remote safety shutdown system suitable for a hazardous material delivery truck performing metered delivery service.

BACKGROUND OF THE INVENTION

Recently implemented U.S. Department of Transportation (DOT) safety regulations for hazardous material delivery trucks performing metered delivery service require a radio remote safety shutdown system. The system must have a range of 300 feet and be capable in an emergency of closing the delivery truck's valve and shutting down the engine, which normally powers the fluid pump for discharge fluid from the vehicular tank. Such an emergency may be characterized by delivery problems such as unexpected fluid loss.

DOT regulations require delivery vehicles with a capacity less than 3500 gallons to have a "kill" button on a remote transmitter, allowing the operator to manually and remotely shutdown the valve and engine by pressing the kill button. Delivery vehicles with a capacity greater than 3500 must further have a "query" feature. The query feature is typically implemented using a controller programmed to trigger a shutdown system after a specified time interval (for example, 5 minutes) unless it receives input from the operator, such as by pressing a button on the remote transmitter. The query feature for larger capacity vehicles anticipates the possibility that transmitter batteries may fail or the operator may not comply with the requirement to carry the transmitter at all times. The query feature is not required, however, on vehicles with a capacity under 3500 gallons of product, which constitute the majority of delivery vehicles.

DOT regulations require that remote safety shutdown systems be tested daily to assure proper operation. A working transmitter carried by the delivery operator must be capable of transmitting to the receiver at all times during the delivery cycle. Safety systems also typically provide some type of "low battery" indication on the transmitter.

Many of the existing systems have only the minimum required functionality, which, for trucks with capacities of less than 3500 gallons, is limited to a kill button. Because a kill button function is only used in an emergency, an operator may be less inclined to keep the transmitter nearby while performing routine delivery duties. This increases the likelihood that the operator will neglect the transmitter, such as by leaving the transmitter in the truck or allowing the batteries to run down. Nothing compels operators to comply with DOT regulations by carrying an operational transmitter, and operators may be free to deliver product without using the transmitter.

Although not required for DOT, the query feature may be used on delivery vehicles having less than a 3500 gallon capacity. The query feature is typically initiated when the operator sets the parking brake of the vehicle while the engine is running. Once activated, the operator must repetitively reset the timer prior to expiration of a given time interval. One perceived problem with such a feature is that the query feature may sometimes be activated when it is not needed, such as when the truck is being warmed up with the parking brake on prior to a delivery run. Then the operator must repetitively reset the timer in accordance with the query feature to prevent the engine from being disabled, even though no product is being transferred.

Some safety system manufacturers have addressed this problem by internally tying the query timer electronically to the activation of the power take off (PTO), which is when the query feature is more likely necessary. The PTO is a power drive shaft that drives the pump on the fluid delivery system, which means the fluid delivery system is likely in use. Tying the system to such a function ensures that the query timer will be activated only when both the parking brake is on and the pump is running. This configuration will not interfere with the operator's ability to idle the vehicle with the parking brake set, such as to warm up the vehicle on a cold morning.

Although such a configuration may be an improvement on the minimum required functionality, more can be done to ensure operator compliance when only a kill button is used, and the prior art has failed to identify or implement such further measures.

The disadvantages of the prior art are overcome by the present invention, and an improved safety shutdown system suitable for hazardous material delivery trucks is disclosed.

SUMMARY OF THE INVENTION

A safety shutdown system is provided for controlling a fluid delivery system. The fluid delivery system includes a valve for selectively closing flow between a first and second fluid vessel. The first and second fluid vessels are preferably a tank on a vehicle and another tank structurally separate from the vehicle. The safety shutdown system comprises one or more sensors responsive to one or more selected fluid delivery characteristics to generate a timer activation signal. A timer is activated in response to the timer activation signal for timing a countdown interval. A wireless transmitter is provided for selectively transmitting a timer reset signal to the timer to reset the countdown interval. The wireless transmitter preferably transmits within a radio frequency range.

A controller is provided for automatically closing the valve if the timer times out, to prevent further fluid flow. The controller may also automatically turn off a vehicle engine if the timer times out.

The one or more sensors may include a pressure sensor for sensing fluid pressure or a flow rate sensor for sensing fluid flow rate. The sensors may also include a lever motion sensor responsive to motion of a lever on the fluid delivery system.

The system may include one or more function activators for activating one or more selected functions in response to a function activation signal from the wireless transmitter. The function activators may include a throttle speed activator for selectively increasing engine speed on a vehicle, a reel rewind activator for selectively rewinding fluid hose onto a reel. The "kill" button on the receiver is only used in an emergency and will shut down the vehicle engine and close the fluid supply valve. When the "kill" signal is received by the controller, either as a function of the operator pressing the "kill" button on the transmitter or an internally generated kill signal generated by the timer timing out; the controller will terminate all functions and disable the system such that power must be removed and reapplied to restart the system. This "latching off" feature prevents accidental reactivation of the system after a shutdown.

The most unique operational feature of the system is a set of user accessible terminals that can be configured to enable the timer under various vehicle operating conditions.

Typically, the timer is enabled only when actual transfer of hazardous product is occurring. Thus the user is forced to carry a working transmitter during product transfer since a working transmitter is necessary to send a timer reset signal to the controller periodically or subsequently the timer will time out and product transfer will cease.

This feature is particularly useful in "low end" systems where the only functionality desired is the kill function, yet the timer feature is desired to force the operator into carrying a working transmitter during product transfer.

As a further operational feature, the system will include an alarm output initiated by the controller to warn of an impending timer time-out, giving the operator an opportunity to transmit the "timer reset" signal to prevent a system shutdown. Typically the alarm output will be connected to the vehicle backup warning horn.

The foregoing features, advantages and objects of the present invention will be more fully understood and better appreciated by reference to the following description and drawings.

DETAILED DESCRIPTION OF PREFERRED EMBODIMENTS

The present invention is well suited for a hazardous materials delivery truck delivering fluids from a tank on the truck to another tank, such as a propane tank, structurally separate from the tank. Accordingly, the invention is illustrated and explained in the context of a hazardous material delivery truck. It should be noted, however, that the invention can be applied more generally in other contexts and environments wherein a fluid from one fluid vessel is to be delivered to another fluid vessel.

Figure 1:
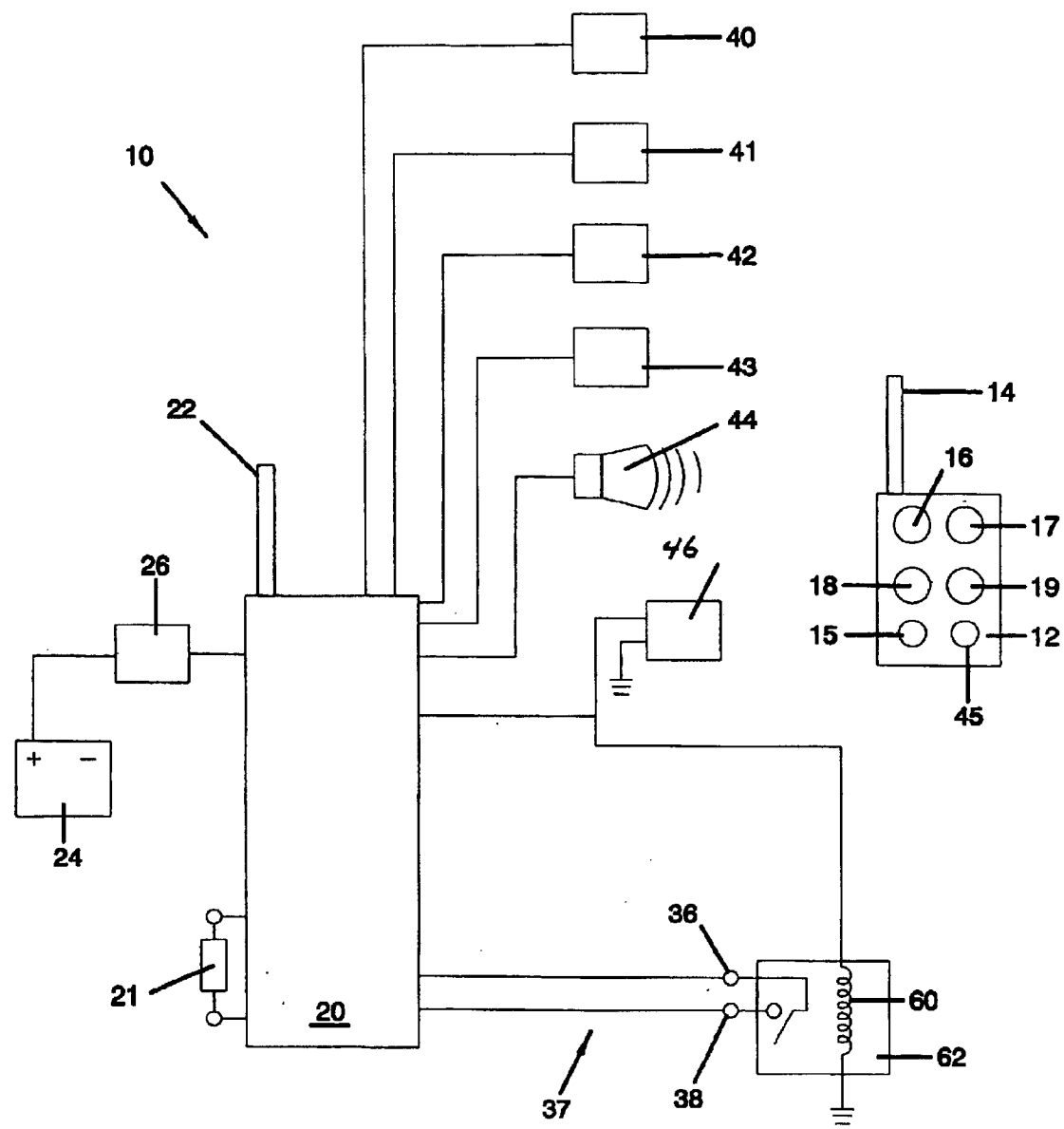
FIG. 1 shows an embodiment of a safety shutdown system according to the present invention.
Figure 3:
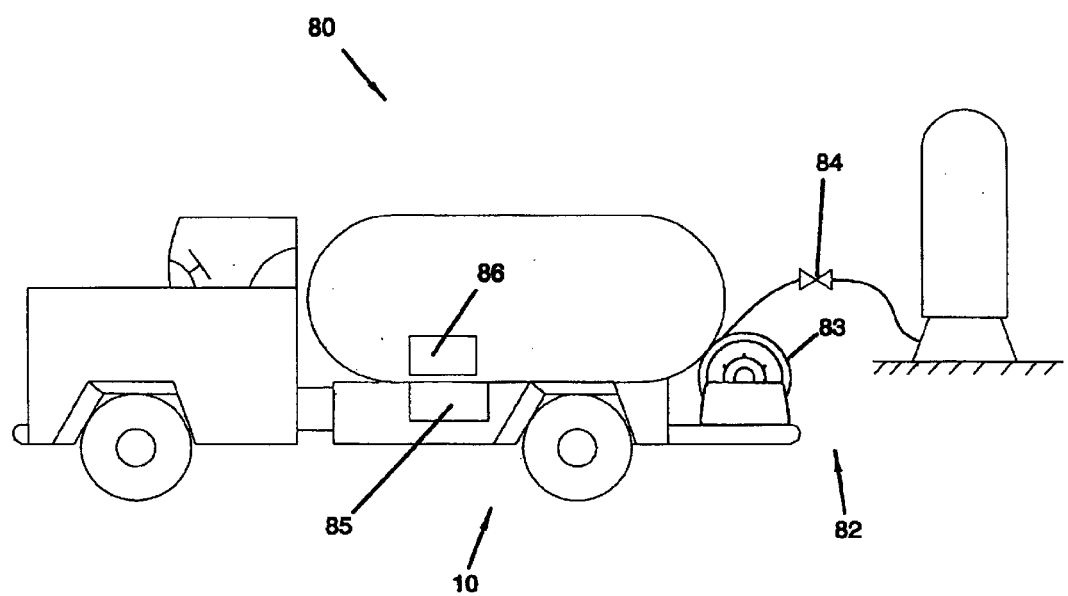
FIG. 3 shows a safety shutdown system mounted on a vehicle.

FIG. 1 represents a preferred embodiment of a safety shutdown system 10. The safety shutdown system 10 may be used on a vehicle 80 (FIG. 3) having a fluid delivery system 82. The safety shutdown system 10 includes a remote transmitter 12 having a transmission antenna 14 and one or more user-operated buttons represented by buttons 16, 17, 18, 19, 15, and 45. A controller 20 includes a receiving antenna 22 for remote communication with the remote transmitter 12. An operator may input signals to the controller 20 using the remote transmitter 12, such as by pressing buttons 16, 17, 18, and 19. Buttons 16, 17, 18, and 19 may be pressed individually or in combination to activate vehicle functions 40, 41, 42, and 43. For example, button 16 may send a signal to the receiver 20 to activate a miscellaneous auxiliary function 40. This auxiliary function 40 may be chosen and connected to the system 10 by the operator. Likewise, pressing buttons 17, 18, and 19 may activate other user-selected functions such as throttle function 41 to increase or decrease throttle speed, reel rewind function 42 to rewind a hose reel, and engine kill function 43 to "kill" or shut off a vehicle engine, respectively. Other embodiments may have a greater or lesser number of vehicle functions, and a corresponding greater or lesser number of vehicle function buttons on the transmitter 12, which may be pressed alone or in combination to activate the vehicle functions.

Power is supplied to the controller 20 from a power source 24, which is typically a vehicle battery 24. One or more "power-on" functions 26 may be positioned in series with the battery 24 and the controller 20, so that the controller 20 is powered only when the power-on function 26 is active. The typical power-on function 26 used to power-on the controller 20 is the setting of a parking brake. This is to ensure the system is not active when the vehicle 80 is moving because the safety system 10 is capable of shutting down the engine, as discussed below.

The system 10 includes a "query timer" circuit 21, which may be referred to simply as a "query timer" 21. Activation of query timer 21 comprises the initiation of a finite timing interval, such as a 5-minute countdown interval. Once the query timer 21 is activated, the operator may repeatedly reset the query timer 21 using the remote transmitter 12, such as by pressing a timer reset button 15. Resetting the timer 21 restarts the countdown interval. This cycle will continue until either the query timer 21 times out or the query timer 21 is disabled, such as by shutting down power to the system 10. In the event that timer 21 times out, the controller 20 closes valve 84 (FIG. 3) and shuts off the engine through kill function 43. This helps ensure that the operator remains attentive to the operation of fluid delivery system 82. If the operator's attention wanders and he or she fails to continually reset the query timer 21, further fluid delivery will cease after the query timer 21 has timed out. Activation of the query timer 21 can be accomplished based on an event initiated by the receiver 20, as follows. User-connected function 46 is preferably a Power Take Off ("PTO"), which drives the product transfer pump 86. Thus, when the PTO is on, the pump 85 is running, indicating the safety system 10 is needed and the query timer 21 should be activated. As shown in FIG. 1, the PTO function 46 is tied to a relay 62 having relay coil 60, and relay coil 60 is tied to query enable circuit 37, which includes user-accessible query enable terminals 36 and 38. Pressing a PTO button 45 on the remote transmitter 12 sends a signal to the controller 20 to turn on or off the PTO function 46. Turning on the PTO function 46, in turn, powers relay 62, energizing relay coil 60, to close query enable terminals 36 and 38, thus completing query enable circuit 37 and activating the query timer 21.

An important aspect of the invention is that the query enable terminals 36 and 38 are accessible to the system installer to selectively connect the PTO function 46 to the system 10, as opposed to being "hardwired" electronically to the safety shutdown system 10. Query enable terminals 36 and 38, may be configured to enable the query timer 21 upon opening or closure. In one embodiment, timer 21 is enabled "on open," meaning that terminals 36 and 38 are not shorted. Enabling timer 21 when the contacts 36, 38 are open increases safety. If wires to the query enable terminals 36 and 38 are cut or otherwise provide an open circuit between terminals 36 and 38, the query feature will fail in the enabled state.

Figure 2:
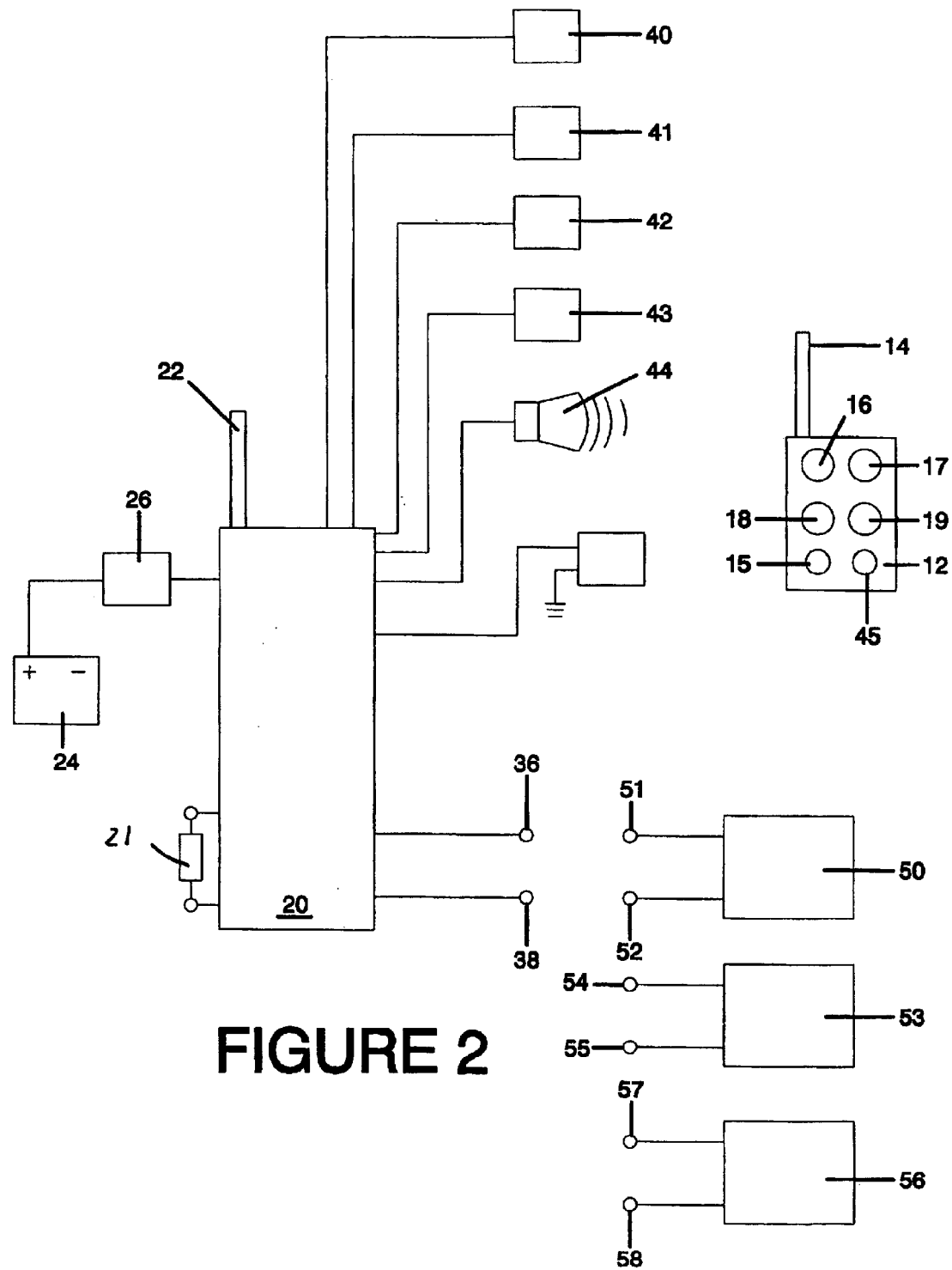
FIG. 2 shows another embodiment of a safety shutdown system according to the present invention.

Another important aspect of the instant invention is that terminals 36 and 38 are also accessible by the installer for activation of the query timer 21 based on a completely independent electrical, mechanical, or pneumatic event not initiated by the controller 20, as represented in FIG. 2. The user may connect any number of electronic vehicle sensors or switches exemplified by vehicle switches 50, 53, and 56, via contacts 51/52, 54/55, and 57/58, respectively, to query enable contacts 36, 38. Vehicle switches may include a pressure switch 50, flow switch 53 or manual switch 56. Pressure switch 50 may be a switch responsive to a preselected threshold fluid pressure, flow switch 53 may be responsive to a preselected flow rate, and manual switch may be responsive to movement of a lever on the fluid delivery system 82.

Each of these switches may be viewed as a type of fluid delivery sensor, because each is responsive to characteristics of the fluid being delivered or of the fluid delivery system 82. Opening or closing of one or more of switches 50, 53, and 56 may thereby selectively open or close query terminals 36 and 38 to activate the query timer 21. Although switches are used as sensors in the described embodiment, other types of sensors may be used for monitoring characteristics of the fluid and/or fluid delivery system.

The switches 50, 53, and 56 may be placed in series or in parallel with each other and with the query terminals 36 and 38, to obtain a desired combination of open and/or closed switches required to activate the query timer 21. For example, if switches 50, 53, and 56 are placed in parallel with query terminals 36/38, then closing any one of the switches 50, 53, 56 may activate the query timer 21. Alternatively, if switches 50, 53, and 56 are placed in series with query terminals 36/38, then closing of all of the switches 50, 53, 56 is required to activate the query timer 21.

Some more complex embodiments of the safety shutdown system may have the advantage of helping to ensure that the operator will carry the remote transmitter 12, and not misplace or neglect it. This may be accomplished by increasing functionality of the transmitter 12. For example, as discussed above, FIG. 1 illustrates how functions 40, 41, 42, and 43 may be included with safety shutdown system 101 controlled or accessed with buttons 16, 17, 18, and 19. Any number of functions required by the operator to carry out his or her duties may be included, along with corresponding buttons, to help ensure the operator chooses to carry the transmitter 12. This objective is further ensured by including functions normally used during operation of the fluid delivery system 82, such as throttle function 41 and reel rewind function 42, described above. It is important to emphasize, however, that the instant invention is ideally suited even for less complex embodiments not having this increased functionality. Thus, at a minimum, the engine kill function 43 must be included, which, separately from the normal query timer operation, allows the operator to instantly shut off power to the engine, such as if the operator detects a problem with the fluid delivery system 82.

In some embodiments, the safety shutdown system 10 may be programmed to automatically turn off or deactivate vehicle functions such as 40, 41, 42, and 43 if the timer times out.

Some embodiments may include an alarm 44 for sounding before the timer 21 times out. For example, the alarm 44 may begin sounding when a preselected amount of time remains during countdown by the timer 21, to alert the operator that safety shutdown system 10 will soon shut down unless the operator resets the query timer 21.

Although specific embodiments of the invention have been described herein in some detail, it is to be understood that this has been done solely for the purposes of describing the various aspects of the invention, and is not intended to limit the scope of the invention as defined in the claims which follow. Those skilled in the art will understand that the embodiment shown and described is exemplary and various other substitutions, alterations, and modifications, including but not limited to those design alternatives specifically discussed herein, may be made in the practice of the invention without departing from the spirit and scope of the invention.

What is claimed is:

1. A safety shutdown system for controlling a fluid delivery system, the fluid delivery system including a valve for selectively closing flow between a first and second fluid vessel, and an engine for driving a fluid delivery pump, the safety shutdown system comprising:

a timer activated in response to a timer activation signal for timing a countdown interval;

one or more sensors responsive to one or more selected fluid delivery characteristics to generate the time activation signal;

a timer activation input for selectively inputting the timer activation signal to the timer for selectively enabling the timer;

a wireless transmitter for selectively transmitting a timer reset signal to the timer to reset the countdown interval;

a controller for automatically closing the valve and killing the engine if the timer times out; and an alarm for activation by the controller prior to the timer timing out; and one or more function activators for activating one or more selected functions in response to a function activation signal from the wireless transmitter.

2. A safety shutdown system as defined in claim 1, wherein the timer activation input comprises:

at least one pair of input terminals for selectively inputting the timer activation signal.

3. A safety shutdown system as defined in claim 2, wherein the timer activation signal comprises:

a current induced by electrically closing the input terminals to complete a query enabling circuit.

4. A safety shutdown system as defined in claim 1, wherein the one or more sensors are selected from the group consisting of a pressure sensor for sensing fluid pressure and a flow sensor for sensing fluid flow.

5. A safety shutdown system as defined in claim 1, wherein the one or more sensors comprise:

a lever motion sensor responsive to motion of a lever on the fluid delivery system.

6. A safety shutdown system as defined in claim 1, wherein the first fluid vessel is a tank on a vehicle, and the second fluid vessel is a tank structurally separate from the vehicle.

7. A safety shutdown system as defined in claim 1, wherein the one or more function activators are selected from the group consisting of a throttle speed activator for selectively increasing engine speed on a vehicle, a reel rewind activator for selectively rewinding fluid hose onto a reel, and an engine kill activator for selectively shutting down the vehicle engine.

8. A safety shutdown system as defined in claim 1, wherein the controller automatically turns off at least one of the one or more selected functions if the timer times out.

9. A safety shutdown system as defined in claim 1, further comprising:

a set of function connection terminals for selectively connecting the one or more selected functions.

10. A safety shutdown system as defined in claim 1, wherein the alarm sounds prior to the timer timing out.

11. A safety shutdown system as defined in claim 1, wherein the wireless transmitter transmits within a radio frequency range.

12. A safety shutdown system for controlling a fluid delivery system, the fluid delivery system including a valve for selectively closing flow between a tank on a vehicle and another tank structurally separate from the vehicle, and an engine for driving a fluid delivery pump, the safety shutdown system comprising:

a timer activated in response to a timer activation signal for timing a countdown interval;

one or more sensors responsive to one or more selected fluid delivery characteristics to generate the timer activation signal;

at least one pair of input terminals for selectively inputting the timer activation signal;

a wireless transmitter transmitting on a radio frequency for selectively transmitting a timer reset signal to the timer to reset the countdown interval;

a controller for automatically closing the valve and killing the engine if the timer times out;

an alarm for activation by the controller prior to the timer timing out; and one or more function activators for activating one or more selected functions in response to a function activation signal from the wireless transmitter.

13. A safety shutdown system as defined in claim 12, wherein the timer activation signal comprises:

a current provided by electrically closing the input terminals to complete a query enabling circuit.

14. A safety shutdown system as defined in claim 12, wherein the one or more sensors are selected from the group consisting of a pressure sensor for sensing fluid pressure and a flow sensor for sensing fluid flow.

15. A safety shutdown system as defined in claim 12, wherein the one or more function activators are selected from the group consisting of a throttle speed activator for selectively increasing engine speed on a vehicle, a reel rewind activator for selectively rewinding fluid hose onto a reel, and an engine kill activator for selectively shutting down the vehicle engine.

16. A safety shutdown system as defined in claim 12, further comprising:

a set of function connection terminals for selectively connecting the one or more selected functions.

* * * * *